(No Model.)
S. H. RANDALL.
CLUTCH.
No. 502,758. Patented Aug. 8, 1893.
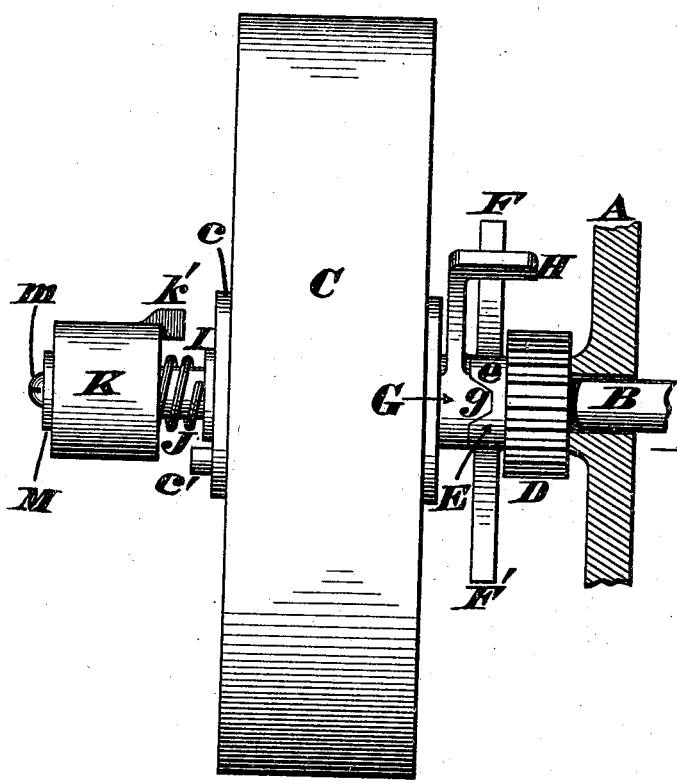
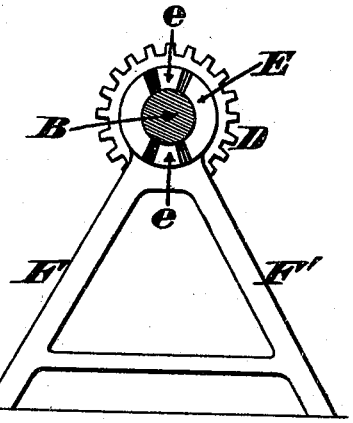
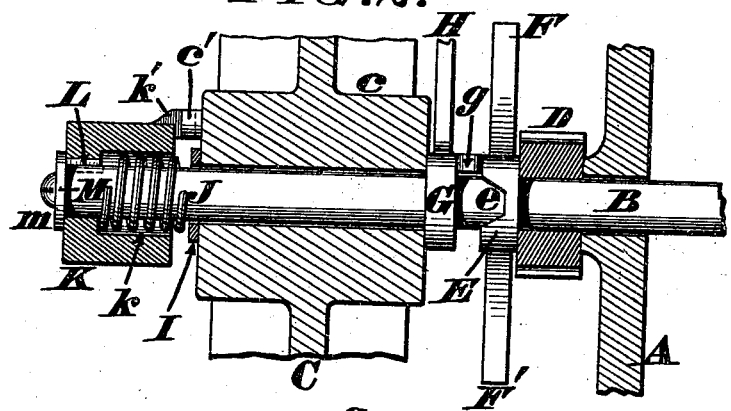
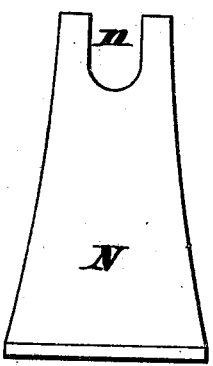
Attest.
L. E. Layman
James Moore
Inventor.
Silas H. Randall
by James H. Layman.
Atty.

UNITED STATES PATENT OFFICE.

SILAS H. RANDALL, OF WYOMING, OHIO, ASSIGNOR OF ONE-HALF TO JAMES D. RANDALL, OF SAME PLACE.

CLUTCH.

SPECIFICATION forming part of Letters Patent No. 502,758, dated August 8, 1893.

Application filed April 29, 1893. Serial No. 472,416. (No model.)

*To all whom it may concern:*

Be it known that I, SILAS H. RANDALL, a citizen of the United States, residing at Wyoming, in the county of Hamilton and State of Ohio, have invented certain new and useful Improvements in Clutches; and I do hereby declare the following to be a full, clear, and exact description of the invention, reference being had to the annexed drawings, which form part of this specification.

My invention comprises a specific detail of construction to be applied to a clutch and used with a certain class of machinery, as hereinafter more fully described.

In the annexed drawings, Figure 1 is a plan showing my improved clutch in its disengaged condition. Fig. 2 is a horizontal section through the engaged clutch. Figs. 3 and 4 are detail views, and Fig. 5 is a modification of the invention.

A represents a portion of the frame of a machine or other structure carrying a shaft B, and C is a loose pulley journaled on the latter and capable of being shifted longitudinally thereof.

D represents a pinion or pulley or cam or other device or attachment that must be secured to the shaft at one side of pulley C. This pinion may either receive or transmit motion, but in the present case it is intended to drive another gear-wheel journaled in the frame A. Owing to this location of the attachment D, the cam collar E, must be arranged between said device D and pulley C, and remains stationary, while, at the same time, it must permit a free turning of the shaft B. Preferably, this collar is held in place by a pair of straddling legs F, F', disposed at any suitable angle and bearing upon a table or the base of the machine to which the clutch is fitted, said legs being more clearly seen in Fig. 4. Again, this cam collar has one or more interdental-spaces $e$, to admit lugs $g$ that project laterally from the counterpart collar G, to which the shifting lever H is applied. One side of this collar bears against one end of the loose-pulley hub $c$, while the other end of the latter has a washer I in contact with it, it being understood that this hub and washer are free to play back and forth a limited distance along the shaft B. Projecting from this end of the hub is a stud $c'$, whose duty will presently appear.

Bearing against the washer I, is a spring J, coiled around the shaft B, and occupying the chamber $k$ of a short gland K, which is bolted or keyed to said shaft at L and secured in place by a washer M and screw or bolt $m$.

$k'$ is a lug or pin projecting from the inner end of this gland, and adapted, at the proper moment, to be acted against by the stud $c'$, of the pulley-hub.

When all the operative parts of this clutch are in their normal positions, as seen in Fig. 1, the stress of spring J forces the pulley C toward the frame A, thereby causing the projections $g$ of collar G to be retained within the spaces $e$ of the other collar E, the shifting lever H being now elevated. Owing to this retracted position of said pulley, it can be turned in either direction without imparting motion to the shaft B, because the stud $c'$ can not now come in contact with the lug $k'$. As soon, however, as it is desired to set said shaft in motion, the free end of lever H is either raised or lowered, thereby causing the projections $g$ to wedge against the end of collar E in such a manner as to advance the collar G, and simultaneously carry forward the pulley C, thus bringing the stud $c'$, to a position where it will strike the lug $k'$. Therefore, when this contact takes place, the gland K will be driven by the pulley C, and shaft B will be turned by said gland, this coupled condition of the clutch being seen in Fig. 2.

The clutch can be uncoupled at any time by simply swinging the lever H, so as to permit the parts to again assume the position seen in Fig. 1.

It is evident, from the above description, that the clutch could not operate if its collar E should turn in either direction, which accident is securely guarded against by providing said collar with the legs F, F'. Or, the same result can be accomplished by fixing a standard N, to the base of the machine, and slotting the upper end of this standard, as seen at $n$, Fig. 5. In this construction, the projection $g$ of the cam collar would normally enter said slot, but would wedge against either side of the same, according to the direction the lever should be turned, for the purpose of forcing the pulley forward. It will be seen that either of these arrangements affords the same advantages, that is to say, the box E is guarded against turning, while at the same time, a pinion D, or any other device or mechanical appliance can be inserted between said box and the frame A, and it is immaterial whether this pinion, or its equivalent, be applied to the shaft B, or to said frame, or to any other part of the machine capable of being located within the space specified. Finally, in Figs. 1 and 2, a single lug $g$ is shown projecting from the cam-collar G, while the construction represented in Figs. 3 and 4 necessitates the use of two of these lugs, thereby indicating that my invention is not limited to any special number of such projections.

I claim as my invention—

The combination, in a clutch, of frame A, shaft B, journaled therein, loose pulley C, mounted upon said shaft and provided with a stud $c'$, member D, fastened to said shaft, stationary cam-collar E $e$, traversed by said shaft and bearing against the member D and located between it and pulley C, rotatable cam-collar G $g$, traversed by said shaft, said rotatable cam-collar engaging with stationary cam-collar E $e$, and in contact with pulley C, a spring J which constantly forces said pulley C against cam-collar G $g$, and a gland K, secured to said shaft and having a lug $k'$ operated by said stud $c'$, substantially as described.

In testimony whereof I affix my signature in presence of two witnesses.

SILAS H. RANDALL.

Witnesses:
JAMES H. LAYMAN,
ARTHUR MOORE.